United States Patent [19]

Nyui et al.

[11] Patent Number: 5,359,193
[45] Date of Patent: Oct. 25, 1994

[54] TALBOT'S INTERFERENCE TYPE OPTICAL ENCODER

[75] Inventors: Masaru Nyui; Masahiko Igaki, both of Tokyo, Japan

[73] Assignee: Canon Kabushiki Kaisha, Tokyo, Japan

[21] Appl. No.: 82,301

[22] Filed: Jun. 28, 1993

[30] Foreign Application Priority Data

Jun. 30, 1992 [JP] Japan ................................. 4-173250

[51] Int. Cl.⁵ .............................................. H01J 40/14
[52] U.S. Cl. .............................. 250/237 G; 250/231.16
[58] Field of Search .......... 250/237 G, 231.16, 231.14; 356/356, 374, 121, 354; 359/439

[56] References Cited

U.S. PATENT DOCUMENTS

| | | | |
|---|---|---|---|
| 4,850,693 | 7/1989 | Deason et al. | 356/35.5 |
| 4,988,864 | 1/1991 | Michel et al. | 250/231.16 |
| 5,170,221 | 12/1992 | Matsui et al. | 250/237 G |
| 5,198,873 | 3/1993 | Ishizuka et al. | 250/237 G |

FOREIGN PATENT DOCUMENTS

| | | |
|---|---|---|
| 0364984 | 4/1990 | European Pat. Off. . |
| 0378773 | 7/1990 | European Pat. Off. . |
| 971504 | 9/1964 | United Kingdom . |

OTHER PUBLICATIONS

K. Hane, Y. Uchida, S. Hattori, "Moire Displacement Measurement Technique for a Linear Encoder", *Optics and Laser Technology*, Apr. 1985, pp. 89–95.

*Primary Examiner*—David C. Nelms
*Assistant Examiner*—Que T. Le
*Attorney, Agent, or Firm*—Fitzpatrick, Cella, Harper & Scinto

[57] ABSTRACT

Disclosed is a Talbot's interference type optical encoder constructed so as to minimize a measurement error due to a signal distortion. A semiconductor laser is installed so that a vertical transverse mode is set in a direction vertical to a moving direction of a diffraction grating serving as a scale. Further, a stop for regulating light beams from a light source is prepared. An aperture of this stop assumes such a configuration that a dimension in a direction along the moving direction of the scale diffraction grating is set equal to or shorter than a dimension in a direction vertical to the moving direction of the scale diffraction grating. Distortions of signals obtained are thereby reduced. A comparison level in signal processing can be centered on an amplitude of the signal, and, as a result, an occurrence of error can be prevented.

7 Claims, 10 Drawing Sheets

TALBOT'S INTERFERENCE TYPE OPTICAL ENCODER

BACKGROUND OF THE INVENTION

1. Field of the Invention

The present invention generally relates to an encoder and, more particularly, to an optical encoder which uses the Talbot's interference principle.

2. Description of the Related Art

Figure 1A:
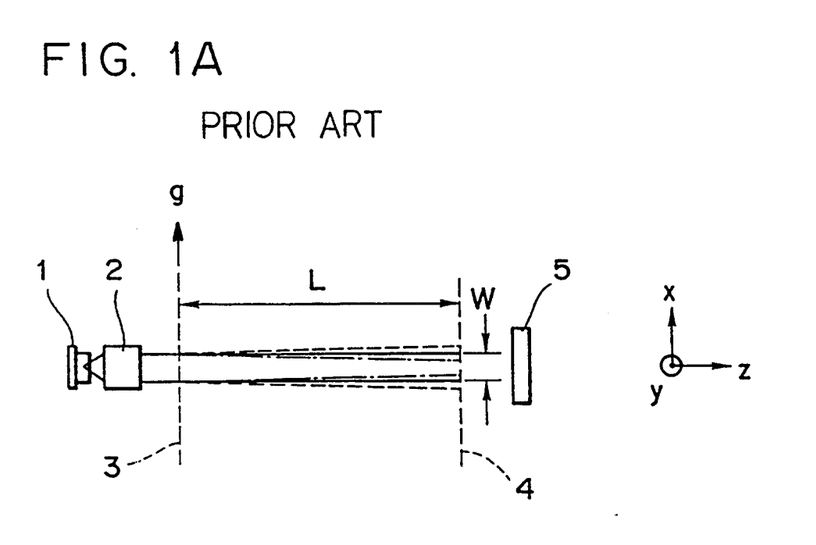
FIGS. 1A and 1B are views showing a basic construction of a Talbot's interference type encoder.
Figure 1B:
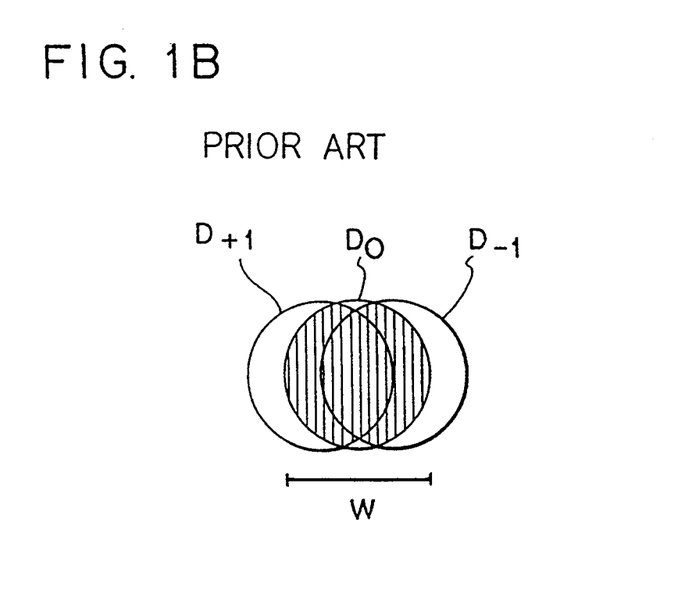

FIGS. 1A and 1B show principles of a conventional encoder based on the Talbot's interference principle. A light source generally designated at 1 in FIG. 1A consists of a semiconductor laser. A collimator lens 2 converts light beams emitted from the semiconductor laser 1 into plane waves which are incident on a diffraction grating 3 with a period P. Based on the Talbot's interference principle, the light beams diffracted by the diffraction grating 3 form interference fringes having the same period P as that of the diffraction grating at given intervals immediately after the diffraction grating 3. The interference fringes are shown in FIG. 1B. FIG. 1B illustrates sections $D_{+1}$, $D_0$, $D_{-1}$ of $+1$st order, 0th order and $-1$st order respectively, diffracted light beams each traveling from the diffraction grating 3. The interference fringes are formed in a region indicated by W in FIG. 1B. An image of the interference fringes is called a Fourier image, and this phenomenon is termed a Talbot's effect. A spacing L between the diffraction grating 3 and a diffraction grating 4, having a distribution of transmittances with the same period as that of the diffraction grating 3, is set such that: $L = N \cdot p^2/\lambda$, where $\lambda$ is the wavelength of the light source, P is the period of the diffraction grating, and N is a natural number. The diffraction grating 3 moves in a g-direction, whereby dark and bright output signals can be obtained via a photosensor 5 disposed behind the grating 4. Thus, pulse signals are generated by an unillustrated signal processing system. A g-directional displacement quantity of the diffraction grating 3 is detected by counting the pulse signals. The photosensor 5 may be in some cases replaced with two pieces of photodetectors A, B (see FIG. 3) to obtain 2-phase sine wave signals.

Figure 2:
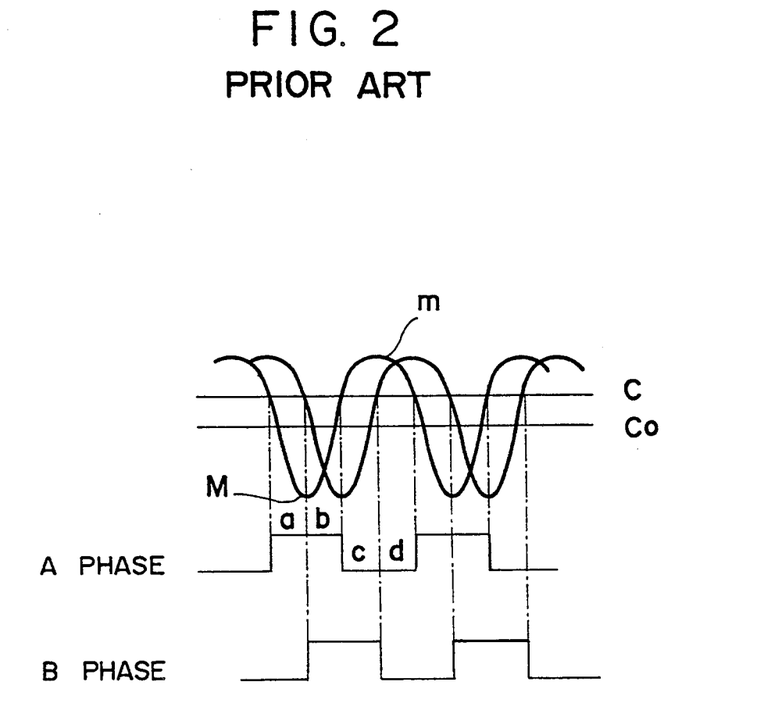
FIG. 2 is an explanatory diagram showing signals in a conventional Talbot's interference type encoder.

However, the following problems are inherent in the optical encoder which uses the Talbot's interference principle in the prior art. FIG. 2 shows the 2-phase signals obtained by the optical encoder described above and rectangular wave signals generated therefrom and assuming two phases A, B. A direction in which the semiconductor laser serving as a light source is installed, i.e., a vertical transverse mode of the beam emitted from the semiconductor laser, coincides with an x-direction (namely, the g-direction) in which the diffraction grating 3 moves. In this case, a waveform in an intensity distribution of the Fourier image formed identically with the grating 4 assumes, as illustrated in, e.g., FIG. 2, a more rounded shape on a dark-side m than on a bright-side M. When setting a comparator level (slice level) C for generating square waves taking HIGH and LOW levels at equal intervals from signals taking this configuration, it follows that a setting position is not centered in a signal amplitude but shifts to the dark-side m. Referring to, e.g., FIG. 2, when the comparator level is set at an amplitude center $C_O$ of the signal, a HIGH-to-LOW ratio, i.e., a duty, of the square wave becomes such that HIGH<LOW. A duty ratio cannot therefore be set to 1:1. Further, when employing 2-phase square waves, a HIGH-to-HIGH interval or a HIGH-to-LOW interval of these 2-phase signals is narrowed; or, in other words, a b or d interval is narrower than an a or c interval with respect to phase differences a, b, c, d between a HIGH and a LOW of the pulse. This is conducive to a defect wherein an allowance is lost in an attempt to perform multi-splitting of the signal, i.e., interpolation processing.

Moreover, if the comparator level setting position deviates from the center (comparator level C) of the signal amplitude, there exists a possibility in which the rectangular pulses may not be generated if the amplitude fluctuates due to this deviation and amplitude alternation. Namely, it may happen that the dark-side signal having a smaller amplitude with respect to the comparison level C does not exceed the comparator level because of the fluctuation in amplitude.

Such a distortion in waveform is produced due to the following causes. A Fourier image is produced due to an interference between the $+1$st order diffracted light and the 0th order diffracted light or between the $-1$st order diffracted light and the 0th order diffracted light. It is therefore necessary to increase a region to the greatest possible degree where the $+1$st or $-1$st order diffracted light is superposed on the 0th order diffracted light on the diffraction grating 4. Turning to FIG. 1B, however, a superposed region of sections $D_{+1}$, $D_{-1}$ of the $\pm 1$st order diffracted light beams is large. Formed in this region are fringes having an interval which is half as small as an interference fringe interval of the Fourier image. It follows that these fringes exert adverse influences, such as noise on a detection signal.

Figure 3:
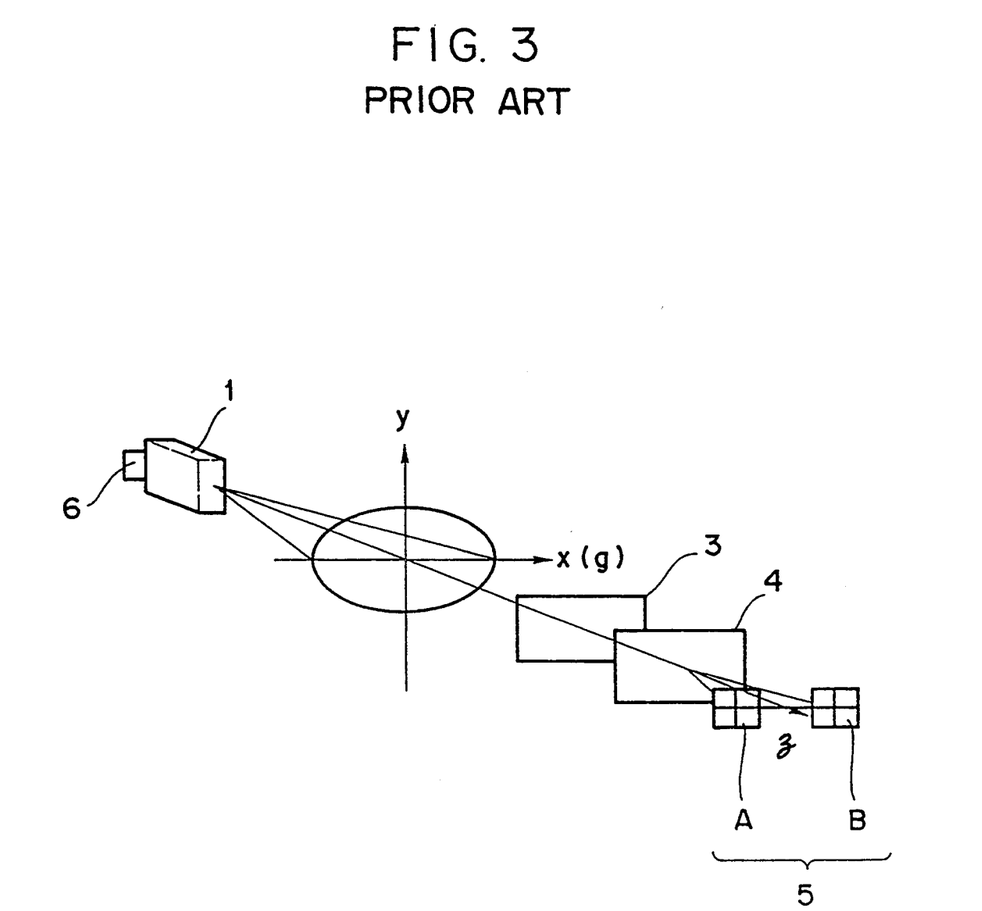
FIG. 3 is an explanatory view illustrating a layout of an optical system in the conventional Talbot's interference type encoder.
Figure 4:
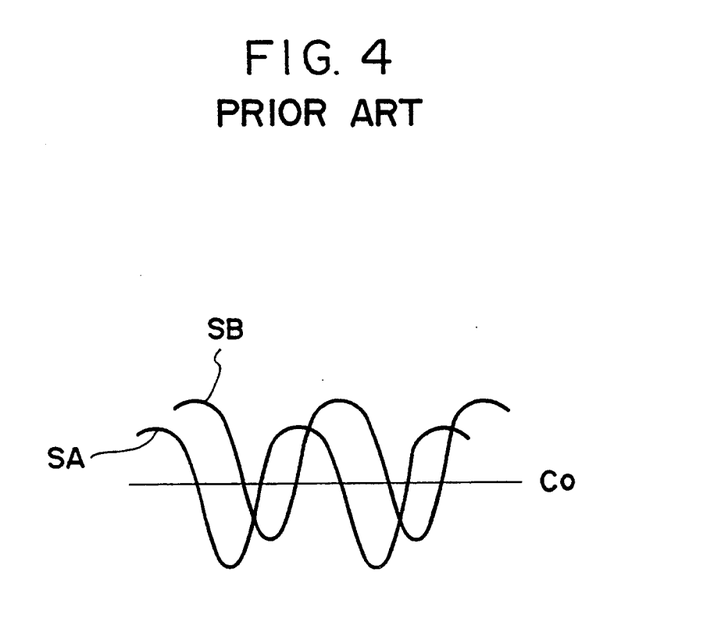
FIG. 4 is an explanatory diagram showing signals in the conventional Talbot's interference type encoder.

The following problems also arise. FIG. 3 is an explanatory view showing a layout of an optical system of the present apparatus. The collimator lens 2 is omitted in FIG. 3. According to the prior art apparatus, the auto power control (APC) oriented photodiode chip 6 is, as shown in FIG. 3, attached in the x-direction of the light source 1. An internal reflection light, or the like, traveling toward the surface of this chip 6 is reflected by this surface towards a z-direction. In this case, the light is mixed as a flare in the A-side of photosensor 5, with the result that unnecessary DC components are included in output signals (2-phase signals SA, SB) of the photo detectors A, B as shown in FIG. 4.

SUMMARY OF THE INVENTION

It is a primary object of the present invention, which has been devised in view of the problems inherent in the prior art described above, to provide an optical encoder constructed so as to minimize a measurement error due to a signal distortion.

To accomplish the object given above, according to one aspect of the present invention, there is provided an encoder for obtaining information on a displacement of a diffraction grating serving as a scale by making light beams from a light source incident on the scale diffraction grating, projecting interference fringes produced by the diffracted light of the scale diffraction grating on a diffraction grating located in a face-to-face relationship to the scale diffraction grating and detecting light beams from the above-mentioned diffraction grating facing the scale diffraction grating. In this encoder, the light source is a semiconductor laser. The semiconductor laser is installed so that a vertical transverse mode of the beams thereof is set in a direction vertical to a moving direction of the scale diffraction grating.

Further, according to another aspect of the present invention, there is provided an encoder for obtaining information on a displacement of a diffraction grating serving as a scale by making light beams from a light source incident on the scale diffraction grating, projecting interference fringes produced on the basis of the Talbot's interference principle by the diffracted light of the scale diffraction grating on a diffraction grating located in a face-to-face relationship to the scale diffraction grating and detecting light beams from the above-mentioned diffraction grating facing the scale diffraction grating. This encoder includes a stop for regulating the beams from the light source. An aperture of this stop assumes such a configuration that a dimension bearing in a direction horizontal to the moving direction of the scale diffraction grating is set equal to or shorter than a dimension bearing in a direction vertical to the moving direction of the scale diffraction grating.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Figure 5:
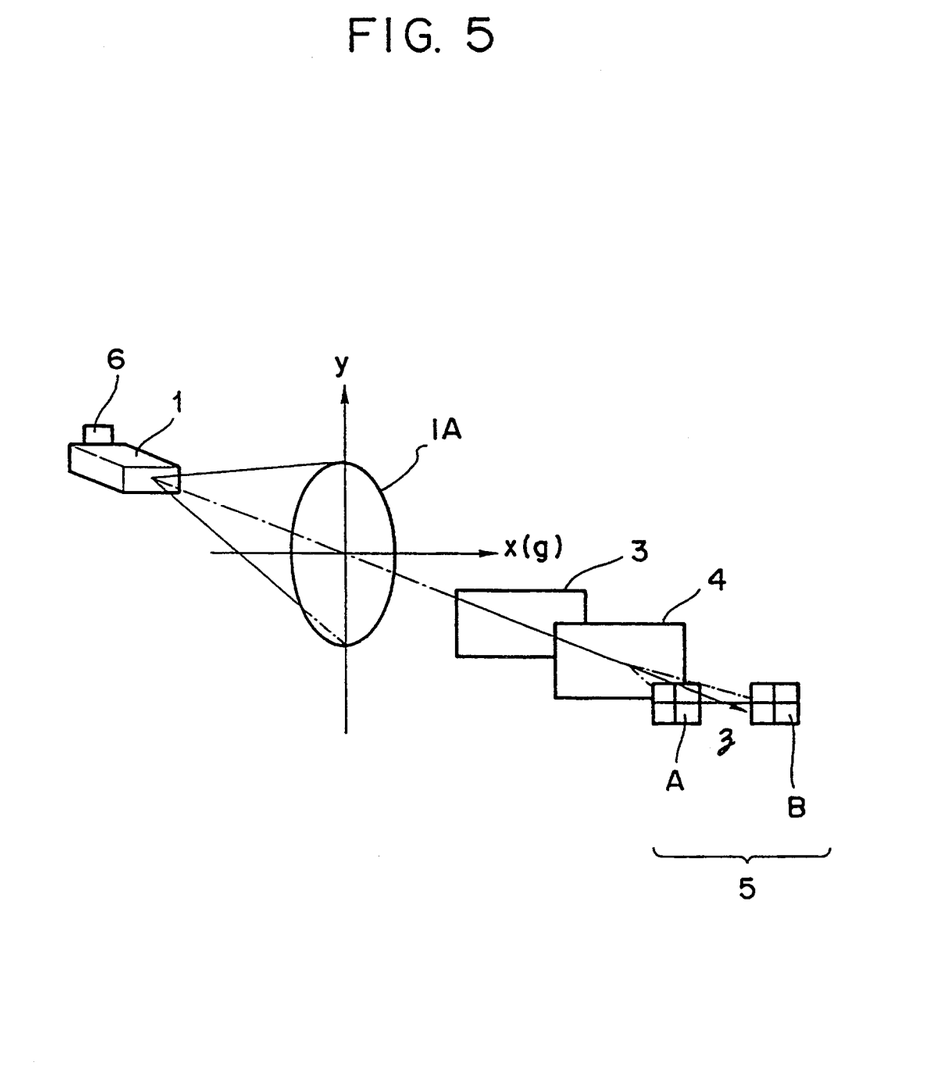
FIG. 5 is an explanatory view illustrating a layout of an optical system of a Talbot's interference type encoder in a first embodiment of this invention.
Figure 6:
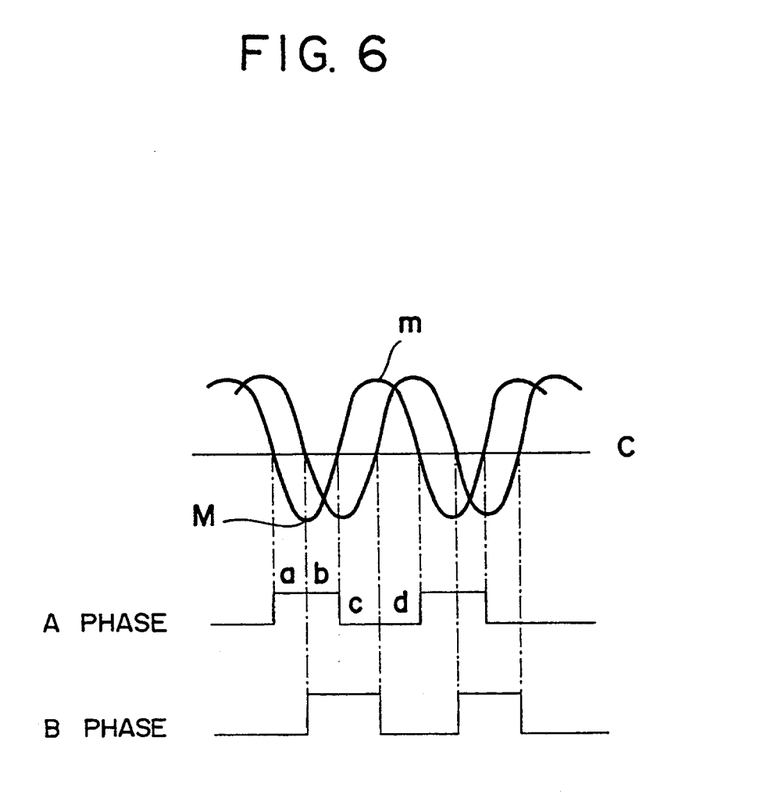
FIG. 6 is an explanatory diagram showing signals in the first embodiment.

FIG. 5 is an explanatory view showing an optical encoder in accordance with a first embodiment of the present invention. A general construction of the present apparatus is the same as that shown in FIGS. 1A, 1B, and hence its explanation and illustration will be omitted. The collimator lens is also omitted for simplicity in FIG. 5. Further, the same members as those in FIGS. 1A and 1B are marked with like numerals and symbols. The symbol 1A represents a section of a beam emitted from a light source 1. In this apparatus, an installing direction of a semiconductor laser configured as a light source, namely, a vertical transverse mode of the beam emitted from the semiconductor laser, coincides with a y-direction vertical to a direction in which a diffraction grating 3 moves. For this reason, it is possible to reduce an x-directional sectional diameter of the beam of each order on a diffraction grating 4. The semiconductor laser 1 is set in a particular direction, thereby forming a Fourier image on the diffraction grating 4. FIG. 6 shows shapes of waveforms of detection signals obtained at that time by photodetectors A, B, in contrast with FIG. 2. In an apparatus in accordance with this embodiment, as shown therein, waveform distortions of 2-phase signals on a dark-side m are more lessened relieved than those on a bright-side M. Namely, as compared with the prior art, the x-directional (the moving direction g of the diffraction grating) beam diameter is regulated on the basis of the layout given above. A superposed region of ±1st order light beams shown in FIG. 1B can thereby be held small. It is possible to reduce the distortions of the signal waveforms due to noise caused from this superposed region. This leads to improvements in terms of the above-mentioned duty ratio and a phase difference as well. Besides, a comparator level can be set in the vicinity of the center of a signal amplitude. Therefore, even if the amplitude fluctuates, an allowance is ensured between the signal and the comparator level. This can make it difficult to cause a non-generating phenomenon of the square waves.

Additionally, according further to the apparatus in this embodiment, a photodiode chip 6 for auto power control (APC) is, as illustrated in FIG. 5, attached to the light source 1 in a y-direction. Therefore, the reflected light from this surface travels in a z-direction. Even when mixed as a flare in a photosensor 5, this flare deviates in the y-direction. The flare is, even if incident, mixed substantially evenly in photodetectors A, B arranged in the x-direction. Accordingly, an influence imparting unnecessary DC components to output signals of the photodetectors A, B is exerted equally on both of the photodetectors. Alternatively, the influence can be eliminated by keeping an adequate distance between the photodetectors A and B.

Figure 7:
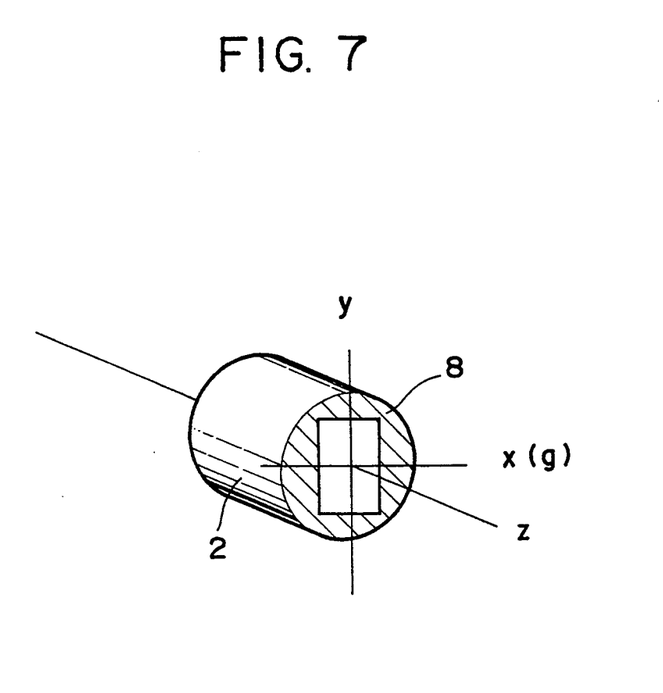
FIG. 7 is an explanatory view illustrating a part of the Talbot's interference type encoder in a second embodiment of this invention.
Figure 8:
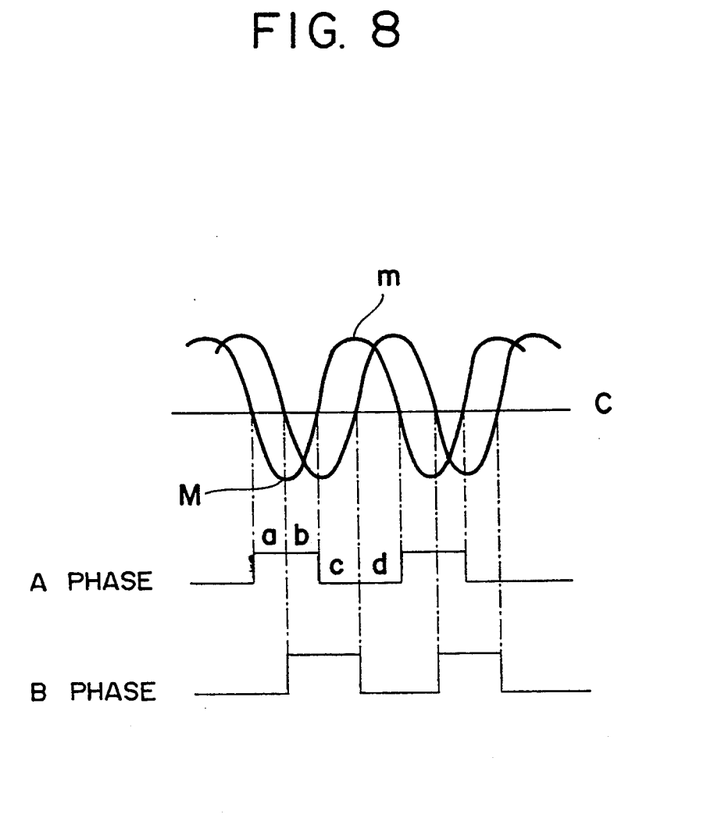
FIG. 8 is an explanatory diagram showing signals in the second embodiment.
Figures 9A, 9B, 9C:
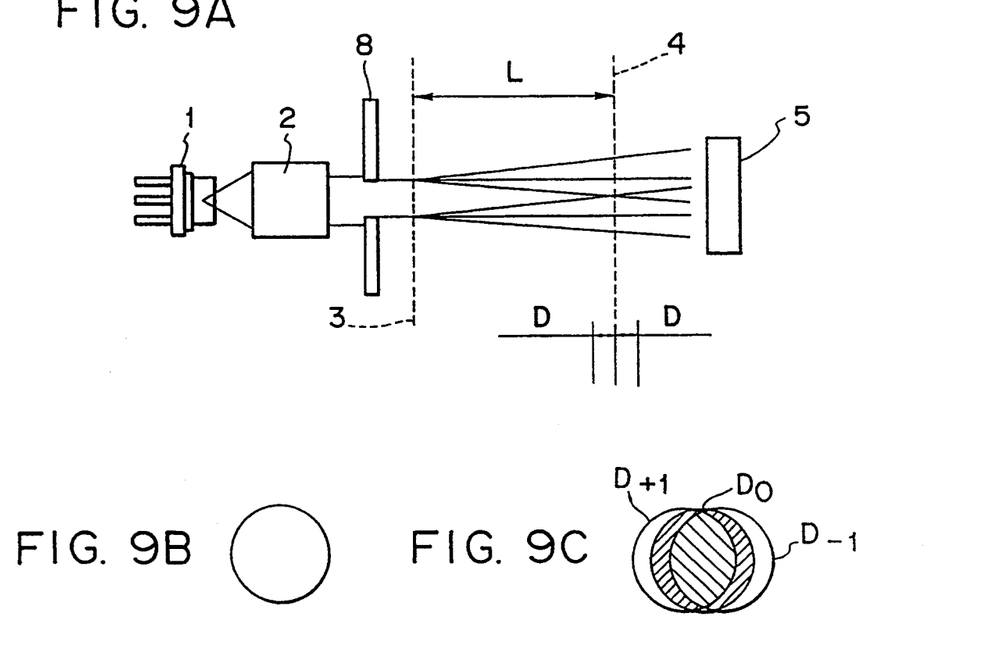
FIGS. 9A through 9I are explanatory views showing effects of the second embodiment.
Figure 9D:
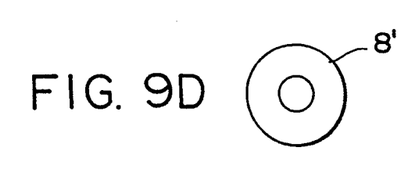
Figure 9E:
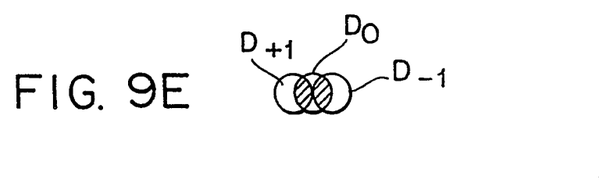
Figure 9F:
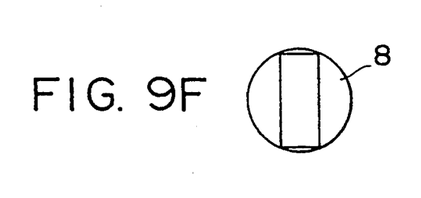
Figure 9G:
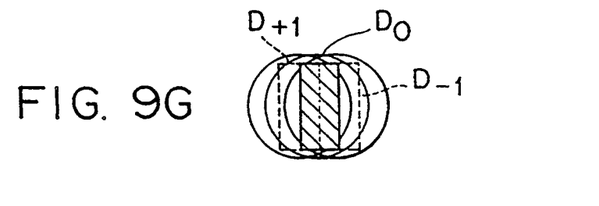
Figure 9H:
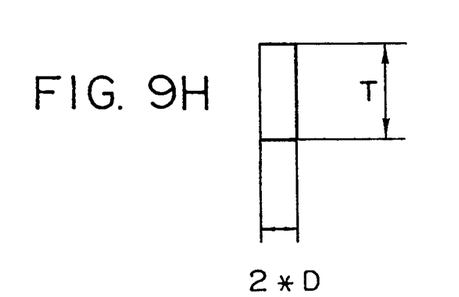

FIG. 7 is an explanatory view of the optical encoder in a second embodiment of this invention but illustrates, in perspective, only a portion in the vicinity of a collimator lens 2. Other configurations are the same as those in FIGS. 1A and 1B. The present apparatus is provided with a stop 8 for regulating the x-directional beam diameter on the beam outgoing side of the collimator lens 2. FIG. 8 shows, comparatively with FIG. 2, shapes of the waveforms of the detection signals obtained from the respective photodetectors when a Fourier image is projected on the diffraction grating 4 in the case of regulating the x-directional beam diameter. As in the same way shown in FIG. 6, the distortions of the waveforms on the dark-side m are lessened more than those on the bright-side M. This will be demonstrated by FIGS. 9A to 9I. FIG. 9A is a view illustrating a layout of a second embodiment of the present invention, and the same members in FIGS. 1A, 1B and 5 are marked with like numerals and symbols. Supposing that a section of the beam coming from the collimator lens 2, when the stop 8 is not inserted, takes a shape as shown in, e.g., FIG. 9B in this optical layout, the sections $D_{+1}$, $D_0$, $D_{-1}$ of the diffracted light beams of the respective orders resulting on the diffraction grating are illustrated in FIG. 9C. Increased in this case is a region (indicated by oblique lines) wherein ±1st order diffracted light beams are superposed. Interference fringes of a spatial frequency different from the period of the diffraction grating are formed in this region. Therefore, high-frequency components are superposed on the output signals, thereby producing distortions in the shapes of the waveforms. In contrast with this, if a stop 8' for regulating the beam diameter is inserted as shown in FIG. 9D, though a loss of light quantity is induced, as illustrated in FIG. 9E, the superposed region of the ±1st order diffracted light beams can be diminished. Contrastingly in this embodiment, an aperture of the stop 8 takes such a rectangular shape that an x-directional length is small, whereas a y-directional length is large (see FIG. 9F) in order to minimize the loss in the light quantity. FIG. 9G illustrates a superposed state of the diffracted light beams of the respective orders on the diffraction grating 4 in this case. Thus, the superposed region of the ±1st order diffracted light beams can be reduced. Besides, a signal light quantity can be increased by taking a large region (indicated by the oblique lines) where the Fourier image is formed. The x-directional beam diameter is regulated in this manner, thereby improving the duty ratio and phase difference described before. In addition, the comparator level can be set in the vicinity of the center of the signal amplitude. Even when the amplitude fluctuates, the allowance is ensured between the signal and the comparator level, with the result that it becomes difficult for the non-generating phenomenon of the square waves to appear. At the same time, the y-directional beam diameter is enlarged enough to prevent the loss of the light quantity. The S/N ratio is further increased by augmenting the signal light quantity. FIG. 9H shows a configurational example of the aperture of the stop 8. If 2*D, and T are respectively defined as the x- and y-directional measures, L is the spacing between the diffraction gratings 3 and 4, λ is the wavelength of the beam from the light source 1 and P1 is the grating pitch of the diffraction grating 3:

$$D = L \cdot \tan \theta,$$

where $$\theta = \sin(1/P1)$$

Figure 9I:
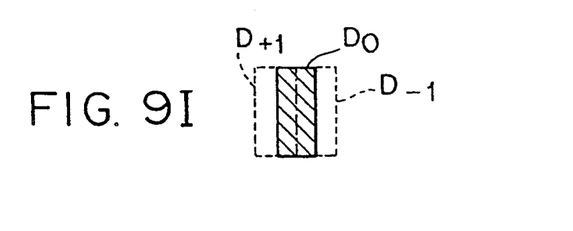

When the conditions given above are satisfied, as shown in FIG. 9I, it is possible to maximize an area of the region where the Fourier image is produced in such a state that the mutually superposed region of the ±1st order diffracted light beams on the diffraction grating 4 is theoretically totally eliminated. However, if the range is such that the signals are not so influenced, there is substantially no problem even when this formula is deviated from.

In accordance with the first embodiment shown in FIG. 5, the stop 8 illustrated in FIG. 7 may be installed as in the second embodiment. In this instance, it is desirable that the x-directional beam diameter can be further regulated.

Figure 10:
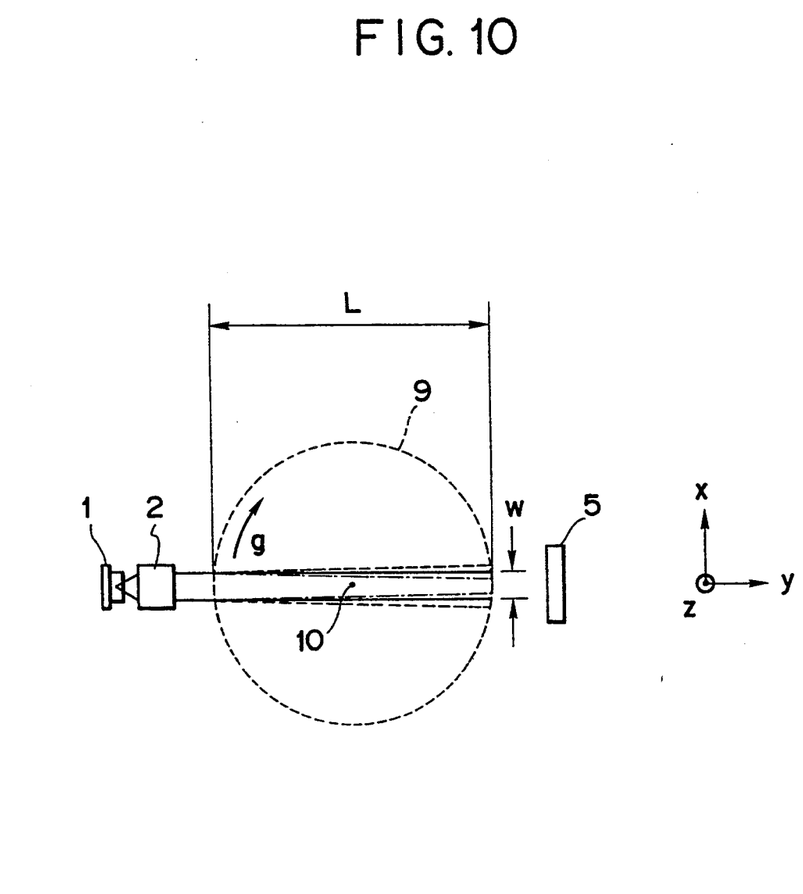
FIG. 10 is an explanatory view showing still another embodiment of the present invention.

Shown in the embodiment discussed above are the movable diffraction grating 3 and the grating 4 fixedly located a distance L apart therefrom and exhibiting the transmittance distribution with the same period as that of the diffraction grating 3. As shown in FIG. 10, however, the above-mentioned diffraction gratings 3, 4 may be connected on a circle, thus forming a cylindrical diffraction grating 9 having a diameter L. In this case, the diffraction grating 9 is rotated about a rotary shaft 10 in a g-direction. A bright/dark output signal which is twice the diffraction grating period can be obtained in the photosensor 5. In this case also, the same effects as the those mentioned above are acquired by placing the semiconductor laser 1 as illustrated in FIG. 5 and further installing the stop 8, as shown in FIG. 7, on the light beam outgoing side of the collimator lens 2 or by performing these two arrangements. As stated above, even an encoder for detecting a rotational quantity effectively functions as a means for shaping the waveform in accordance with the gist of this embodiment. Besides, the same effects are, as a matter of course, obtained even by such an arrangement that a cylindrical lens is employed in place of the stop to change a sectional shape of the light beam.

As discussed above, according to the present invention, the optical encoder involving the use of the Talbot's interference principle is capable of improving the duty ratio and the phase difference. In addition, the comparator level can be set in the vicinity of the center of the signal amplitude, and, therefore, the allowance is ensured between the signal and the comparator level. The occurrence of the non-generating phenomenon of the square waves can be thereby made difficult.

It is apparent that, in this invention, a wide range of different working modes can be formed based on the invention without deviating from the spirit and scope of the invention. This invention is not restricted by its specific working modes except being limited by the appended claims.

What is claimed is:

1. An optical encoder for obtaining information on a displacement of a diffraction grating by detecting light beams via the diffraction grating, said optical encoder comprising:
    irradiating means comprising a semiconductor laser for emitting light beams;
    a first diffraction grating for receiving the light beams emitted from said irradiating means; and
    a second diffraction grating onto which interference fringes produced by beams of diffracted light of said first diffraction grating on the basis of the Talbot's interference principle are projected,
    wherein said semiconductor laser is disposed such that a vertical transverse mode of the light beams emitted is set in a direction substantially vertical to a moving direction of said first diffraction grating.

2. The optical encoder according to claim 1, wherein said first diffraction grating and said second diffraction grating are connected on a circle to form a cylindrical diffraction grating.

3. An optical encoder for obtaining information on a displacement of a diffraction grating by detecting light beam from a light source via the diffraction grating, said optical encoder comprising:
    regulating means for regulating sectional shapes of the light beams from the light source;
    a first diffraction grating for receiving the light beams via said regulating means; and
    a second diffraction grating onto which interference fringes produced by the diffracted light beams of said first diffraction grating on the basis of the Talbot's interference principle are projected,
    wherein said regulating means regulates the sectional shapes of the light beams such that a length in relation to a moving direction of said first diffraction grating is equal to or shorter than a length in relation to a direction vertical to the moving direction.

4. The optical encoder according to claim 3, wherein said first diffraction grating and said second diffraction grating are connected on a circle to form a cylindrical diffraction grating.

5. The optical encoder according to claim 3, further comprising a light source and a collimator lens, wherein said regulating means is installed on an outgoing side of said collimator lens.

6. The optical encoder according to claim 3, wherein said regulating means is a rectangular stop whose longitudinal direction is vertical to the moving direction.

7. An optical encoder for obtaining information on a displacement of a diffraction grating by detecting light beams via the diffraction grating, said optical encoder comprising:

irradiating means for emitting light beams assuming a non-circular sectional shape, this sectional shape herein bearing in a longitudinal direction;

a first diffraction grating for receiving the light beams emitted from said irradiating means; and a second diffraction grating onto which interference fringes produced by diffracted light beams of said first diffraction grating on the basis of the Talbot's interference principle are projected, wherein the longitudinal direction is set to substantially coincide with a direction of a grating line of said first diffraction grating.

* * * * *

UNITED STATES PATENT AND TRADEMARK OFFICE
CERTIFICATE OF CORRECTION

PATENT NO. : 5,359,193

DATED : October 25, 1994

INVENTOR(S) : Nyui et al.

It is certified that error appears in the above-indentified patent and that said Letters Patent is hereby corrected as shown below:

Column 1

Line 24,   "order respectively," should read --order, respectively,--;

Line 60,   "taking" should read --having--;

Line 61,   "taking" should read --having--.

Column 4

Line 6,    "more lessened re-" should read --lessened more--;

Line 7,    "lieved" should be deleted.

Column 6

Line 46,   "beam" should read --beams--.

Signed and Sealed this

Twenty-fifth Day of April, 1995

Attest:

BRUCE LEHMAN

*Attesting Officer*      *Commissioner of Patents and Trademarks*